United States Patent [19]

Sjogren

[11] Patent Number: 4,645,069
[45] Date of Patent: Feb. 24, 1987

[54] VACUUM ACCUMULATING CONVEYOR

[75] Inventor: Christer A. Sjogren, Miami, Fla.

[73] Assignee: Quipp, Incorporated, Miami, Fla.

[21] Appl. No.: 797,216

[22] Filed: Nov. 12, 1985

[51] Int. Cl.$^4$ ............... B65G 17/46; B65G 15/58
[52] U.S. Cl. ........................ 198/689.1; 198/688.1; 198/718; 198/810; 198/811
[58] Field of Search ............ 198/688.1, 689.1, 718, 198/725, 809, 810, 811; 271/197

[56] References Cited

U.S. PATENT DOCUMENTS

| | | | |
|---|---|---|---|
| 3,827,548 | 8/1974 | Matsuo | 198/689.1 |
| 3,930,573 | 1/1976 | Wyman | 198/810 X |
| 4,149,626 | 4/1979 | Holt | 198/718 |
| 4,555,013 | 11/1985 | Franklin | 198/689.1 |

FOREIGN PATENT DOCUMENTS 2727638 12/1978 Fed. Rep. of Germany ...... 198/809

Primary Examiner—Jeffrey V. Nase

Attorney, Agent, or Firm—Louis Weinstein

[57] ABSTRACT

A vacuum operated accumulating conveyor including a table with a slick top surface having an elongated gap. A perforated belt moves along said gap above the open ends of a plurality of vacuum chambers arranged end-to-end at spaced intervals beneath the upper run of the belt. A vacuum generator is coupled to each vacuum chamber. A proximity sensor is arranged adjacent to each vacuum chamber. A controller controls the operation of the vacuum accumulating conveyor to collect a group of bundles upon the conveying table by selective operation of the vacuum generators which create a vacuum condition in the associated vacuum chambers to draw a bundle toward the belt to move each bundle a predetermined distance for initially collecting a group of bundles of a desired number and thereafter delivering the group of bundles collected to suitable take-off apparatus. Bundles may also be advanced without being collected in groups. The selective operation of the vacuum generators conserves energy.

22 Claims, 6 Drawing Figures

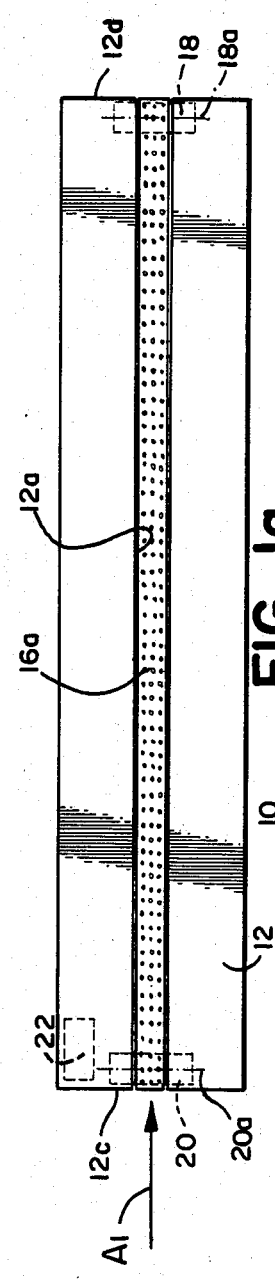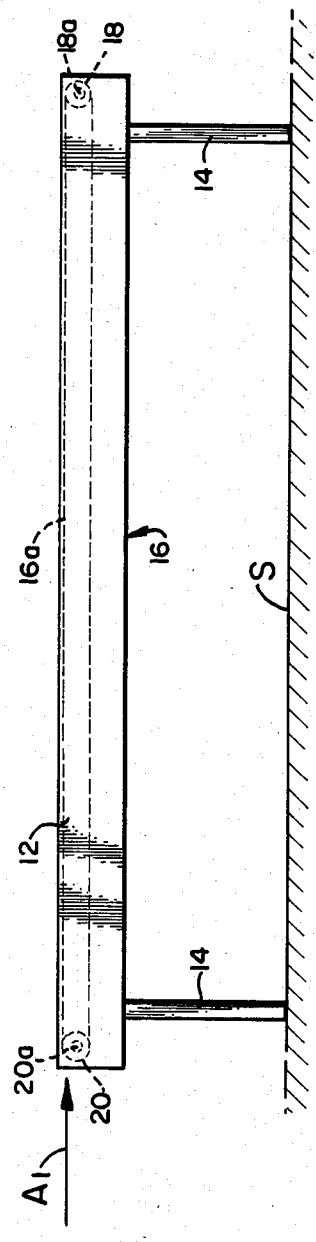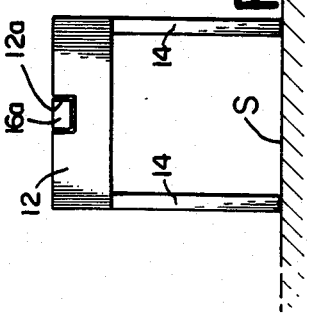

VACUUM ACCUMULATING CONVEYOR

FIELD OF THE INVENTION

The present invention is directed to conveyors and more particularly to a novel conveyor arrangement for advancing bundles along the conveyor utilizing a continuously moving belt arranged in the recess of a delivery table and employing plural vacuum means for selectively drawing bundles to be moved against the moving belt.

BACKGROUND OF THE INVENTION

Newspaper publishers typically prepare newspapers in bundles of predetermined counts. These bundles are then delivered to a table for further distribution. It is desirable to move the bundles to predetermined positions along the table in a manner which is simple, can be performed at high speed and which employs inexpensive and yet reliable equipment. It is also desireable to advance bundles in predetermined groups. Bundles are conventionally advanced along a live roller conveyor whose rollers are rotated to advance bundles. Such live roller conveyors will tear the bottom sheet (or sheets) of bundles which are held against advancement during a bundle accumulating cycle. It is thus not only desireable but important to permit the accumulation of groups of bundles, as well as their advancement, without tearing, wrinkling or otherwise damaging the bottom sheets of the bundles being handled.

BRIEF DESCRIPTION OF THE INVENTION

The present invention achieves all of the above objectives and avoids the disadvantages of conventional apparatus through apparatus characterized by comprising an elongated delivery table having a slick top surface. A constantly moving closed-loop belt has its upper run positioned within a gap in the delivery table. The top surface of the belt upper run is recessed slightly below the aforementioned slick surface. A plurality of chambers are arranged end-to-end beneath the top run of the open-weave, porous belt. Each chamber has an open upper end located immediately below the belt. A plurality of vacuum devices are provided, each being coupled to an associated chamber. The vacuum devices are selectively energized, creating a vacuum within the associated chamber to draw a bundle positioned above the associated chamber against the slightly recessed moving belt which then advances the bundle along the table over a distance equal to the length of the chamber, which is of the order of the length of a bundle measured in the feed direction. A plurality of proximity sensors are provided, each being associated with one of the chambers and arranged at spaced intervals along the delivery table. A controller responsive to preselected input information representative of the location to which each bundle is to be delivered and responsive to the sensing of the movement of a bundle by the proximity sensors, selectively energizes the vacuum generators in a sequential fashion in order to move a bundle along the delivery table and to a predetermined destination. The individual vacuum generators eliminates the need for a large common vacuum generator, and reduce the time during which a vacuum is generated, thus saving both capital costs and operating costs. Delay means turns off each vacuum generator a predetermined delay period after the vacuum generator is turned on, said delay period being a function of the travel speed of the belt, the length of each chamber and the length of the bundle being moved therealong. The delay technique minimizes the amount of power utilized to operate the delivery table equipment.

OBJECTS OF THE INVENTION AND BRIEF DESCRIPTION OF THE FIGURES

It is therefore one object of the present invention to provide a novel delivery system for bundles and the like in which bundles are moved by selectively attracting the bundles to a continuously moving belt recessed within a delivery table.

Another object of the present invention is to provide a novel delivery means for bundles and the like in which the bundles are moved along the delivery table by sequential operation of vacuum chambers arranged end-to-end beneath the upper run of a moving belt arranged within the recess of the delivery table.

Still another object of the present invention is to provide apparatus for moving bundles along a delivery path through the use of vacuum chambers and proximity sensing devices which sense the approach of a bundle for selectively activating an associated vacuum chamber.

Still another object of the present invention is to provide a delivery system for moving bundles along a delivery path through the employment of vacuum means for drawing bundles to be moved against the upper run of a recessed delivery belt wherein the vacuum chambers are maintained vacuumized only so long as is necessary to move a bundle over a vacuum chamber thereby minimizing the power needed to operate the delivery system.

The above, as well as other objects of the present invention, will become apparent when reading the accompanying description and drawing in which:

FIGS. 1a, 1b and 1c respectively show top, side and end views of a vacuum accumulating conveyor embodying the principles of the present invention.

DETAILED DESCRIPTION OF THE INVENTION

Figure 2:
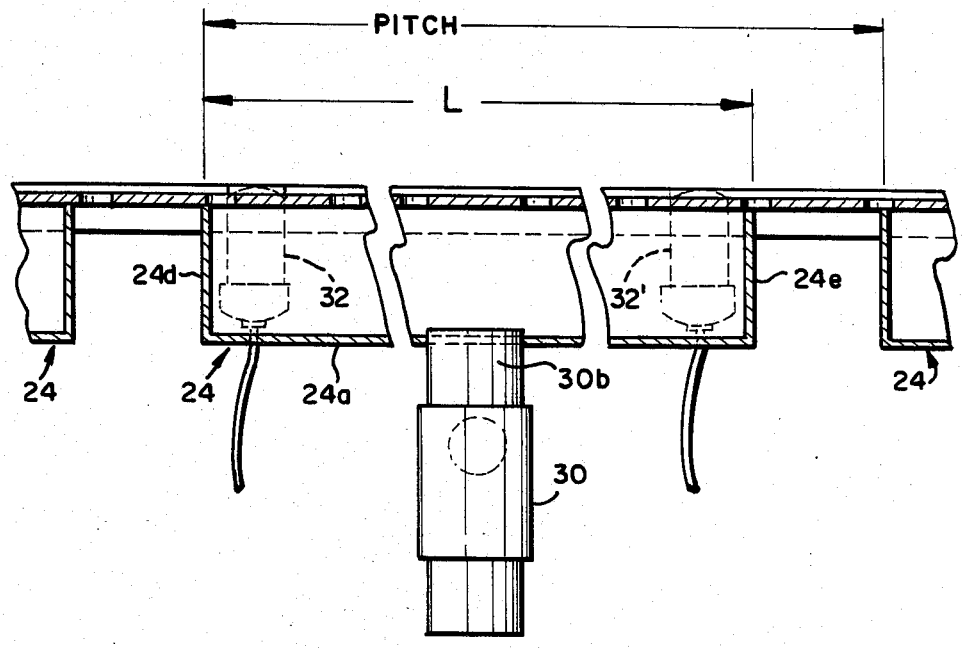
FIG. 2 is a sectional view showing at least one of the vacuum chambers utilized in the conveyor of FIGS. 1a through 1c, in greater detail.

The vacuum accumulating conveyor 10 shown in FIGS. 1a–1c is capable of conveying newspaper bundles or similar products and has the novel feature of being able to que bundles without the use of mechanical stops conventionally employed to hold bundles at a desired location, upon delivery thereto.

The conveyor 10 is comprised of a table having a top 12 provided with an elongated slot 12a of constant width preferably running the entire length of the table. The table is supported a spaced distance above a floor or other supporting surface S by legs 14 arranged at each of the four corners thereof. The top surface 12b of table 12 is slick, i.e. has a low coefficient of sliding friction.

A conveyor belt 16 is comprised of a closed-loop member of an either perforated or open-weave porous material which is capable of passing air through the open-weave or perforations and without imparting significant impedance to the passage of air therethrough. The belt 16 is entrained about rollers 18 and 20 arranged to rotate about shafts 18a, 20a mounted within suitable bearings (not shown) at the opposite ends of table 12. A motor 22 is coupled to shaft 20a of roller 20, either directly or through suitable gear reduction means (not shown for purposes of simplicity). The surface of the belt engaging bundles is preferably slightly adhesive to enhance its adherence to a bundle.

The upper run 16a of belt 16 is slightly recessed below the top surface 12b of table 12 so that the upper run 16a does not normally engage bundles or other products placed upon slick surface 12a.

Either end 12c or 12d may be positioned adjacent a conveyor for delivering bundles or other products to the conveyor system 10, it being understood that motor 12 is arranged to rotate roller 20 in the proper direction. For example, assuming that bundles, such as bundle B, are delivered to the right as shown by arrow A1 in FIG. 1a, motor 22 is operated to rotate roller 20 in the clockwise direction as shown in FIG. 1b, moving the upper run 16a of conveyor belt 16 in the direction shown by arrow A1. If desired, an additional conveyor or other take-off means may be provided at end 12d of the conveyor table.

Figure 2A:
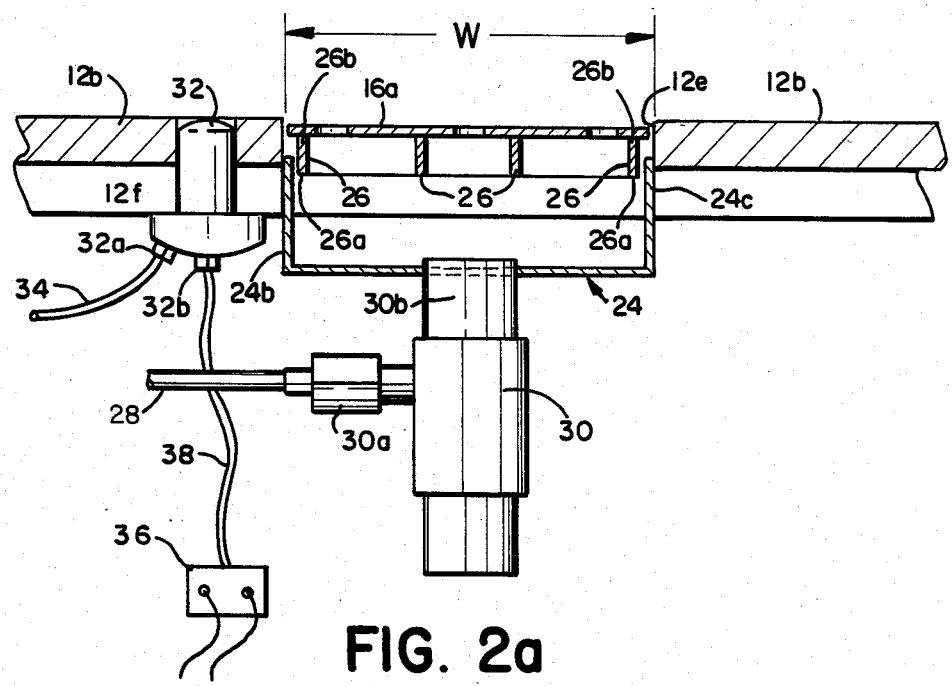
FIG. 2a shows a sectional view of the vacuum chamber arrangement of FIG. 2 looking in the direction of arrows A—A.

FIGS. 2 and 2a show a portion of the table 12 in greater detail. Table 12 is provided with a plurality of vacuum chambers 24, shown partially sectionalized for purposes of simplicity. Each vacuum chamber is comprised of a floor 24a, first and second longitudinal sides 24b, 24c and a pair of lateral sides 24d, 24e, said bottom and said vertical sides cooperating to form a rectangular-shaped hollow chamber having an open upper end.

The upper portions of longitudinal sides 24b and 24c are joined to the elongated side walls 12d, 12e defining the elongated opening 12a extending the length of table 12.

A plurality of elongated vertically aligned plates 26 extend the length of slot 12a and have their lower ends 26a joined to the top edges 24d-1, 24e-1 of ends 24d and 24e. The top surfaces 26b of elongated members 26 are smooth and are preferably formed or otherwise coated with a suitable material having a low coefficient of sliding friction. The top surfaces 26b of members 26 slidably engage and support the bottom surface of the upper run 16a of belt 16 and maintain the top surface of the upper run 16a of belt 16 a spaced distance below the slick top surface 12b of table 12.

Each vacuum chamber 24 is coupled to a common air supply through a conduit 28 which is joined to the coupling 30a of a vacuum producing device which may, for example, be either an air flow amplifier presently available in the marketplace and identified by the trademark TRANSVECTOR, or alternatively, a vacuum generator.

The upper end 30b of vacuum generating device 30 creates a vacuum condition within vacuum chamber 24. This vacuum condition has no effect when no bundles or products are present upon the slick top surface 12b due to the open-weave nature of belt 12. However, when a bundle or other product is placed over at least a portion of vacuum chamber 24, at least the bottom surface of a bundle is drawn downwardly and brought into engagement with the upper run 16a of moving belt 16, causing the bundle or other product to be moved along the top surface of table 12 at least for the length of time during which the bundle is over the vacuumized chamber. It should be understood that the remaining chambers 24 are arranged end-to-end along the length of table 12 and are designed in a manner similar to that described hereinabove.

A pneumatic proximity sensor 32 has its sensing head portion arranged within an opening 12f provided in table 12 and is positioned adjacent the upstream end of vacuum chamber 24. It should be understood that a proximity sensor 32 is provided adjacent each chamber 24 and is preferably arranged at the upstream end thereof. In the event that the vacuum accumulating conveyor is intended to be operated in either direction, a proximity sensor may also be provided at the dotted line location 32' relative to each vacuum chamber, with only those proximity sensors adjacent the upstream end of each vacuum chamber being utilized during any bundle accumulating operation. Obviously, the table may be provided with rollers to turn the table 12 around and thereby move the input end 12c adjacent to the conveyor or other device intended to delivery bundles to the conveyor table.

Proximity sensor 32 is preferably a pneumatic-type proximity sensor and has a coupling 32a joined to a suitable air supply through flexible conduit 34. A second coupling 32b is joined to pneumatic electrical switch 36 through flexible conduit 38. In operation, air under pressure is delivered to the pneumatic sensor 32 through conduit 34, directing a jet of air upwardly. When no bundle is above the proximity sensor, the air passes freely into the atmosphere. When a bundle is positioned above the proximity sensor, at least some of the upwardly directed air is deflected downwardly to deliver air under pressure to the pneumatic-to-electrical switch 36 through flexible conduit 38. Pneumatic-to-electrical switch 36 closes its switch contacts when air under pressure is delivered to its input. Although the preferred embodiment describes the use of a pneumatic proximity sensor, it should be understood that any other type of sensor may be utilized such as for example an optical sensor, an electromagnetic sensor, a switch having a feeler arm slidably engaged by the product, or the like.

Figure 3:
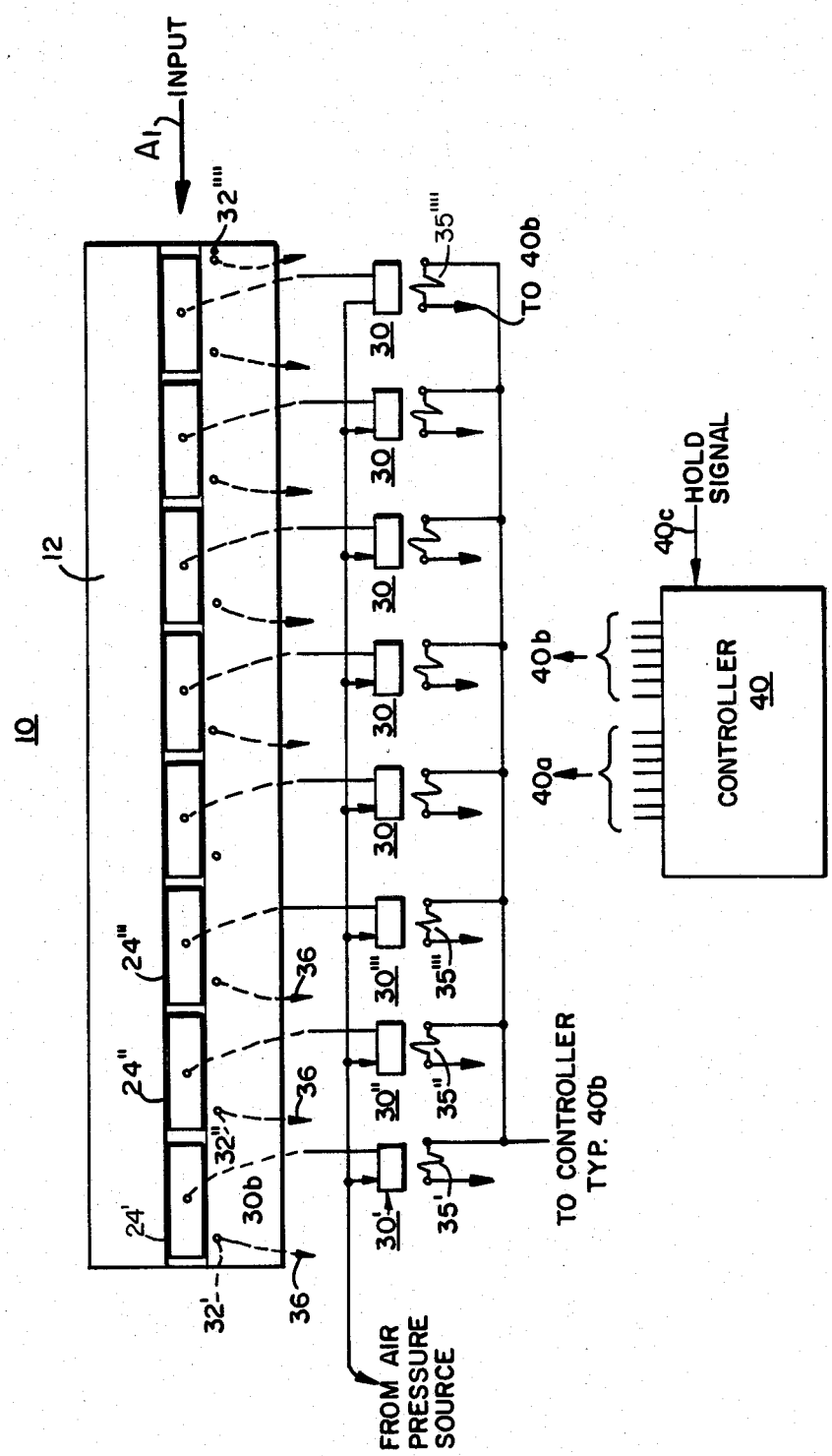
FIG. 3 shows a simplified block diagram of the control system for operating the vacuum accumulating conveyor.

FIG. 3 shows a simplified view of the control system of the present invention including a controller 40 which may, for example, incorporate a microprocessor, and having a first set of input ports electrically connected to the electrical leads of the pneumatic-to-electrical switch members 36. Controller 40 is provided with a set of output ports having a group of lines 40b electrically connected to each of the solenoids 35 incorporated in each vacuum generating device 30.

The input end of the vacuum accumulating conveyor system 10 is shown at the right-hand end of table 12 and delivers bundles to the left as shown by arrow A1. A "start" proximity sensor 32'''' is provided adjacent the input end of the vacuum conveyor.

The vacuum generating devices are selectively controlled by the programmable controller 40, in the following manner:

A "hold" signal is typically generated by equipment downstream of the vacuum accumulating conveyor or by manual means for delivering a pulse hold signal applied to the programmable controller 40 at input 40c causing the programmable controller to prevent release of any bundles to downstream equipment.

The sequential firing of solenoids occurs as the bundle moves along the conveyor, regardless of the presence or absence of a hold signal. Never will all solenoids turn on simply because a bundle activates proximity switch 32''''. When sensor 32'''' is activated, solenoid 35'''' is turned on, thereby conveying the bundle activating the sensor 32'''' to the next downstream proximity switch, thereby activating the next solenoid downstream and so transporting the bundle even further downstream. This sequence will be repeated until the bundle activates proximity switch 32'. If a hold signal is present at this time, solenoid 35' will be immediately deactivated and the bundle will stop. If no hold signal is present, the bundle is simply allowed to continue without stopping and exit from the conveyor.

It should also be noted that each vacuum chamber is only activated as long as a bundle is present either immediately above or slightly above the chamber. This feature, as well as activating only one vacuum generator at a time, saves a considerable amount of energy. It should also be noted that several bundles can be handled simultaneously along the travel path of the conveyor table.

When the hold signal is present and the first bundle is delivered to the input end of the conveyor table, as soon as the first bundle moves over the first pneumatic proximity switch 32'''', solenoid 35'''' is energized to cause the vacuum generator associated with chamber 24'''' to create a vacuum in vacuum chamber 24''''.

Thus, in the presence of a hold signal, controller 40 sequentially energizes each solenoid 35 to cause their associated vacuum units 30 to likewise be turned-on sequentially to create a vacuum condition in each vacuum chamber 24. The bottom of the first bundle is thus drawn against the top run 16a of moving belt 16 and moves downstream from one vacuum chamber to the next toward the left-hand end of the table. When the first bundle delivered to the table actuates the left-hand most proximity switch 32' at the downstream end of table 12 at the time that a hold signal is present, this condition is delivered to programmable controller 40 through pneumatic-to-electrical switch 36, causing programmable controller 40 to immediately turn off the vacuum unit 30' whereupon said first bundle is stopped at the downstream end of table 12. See bundle B'. When the next bundle is delivered to table 12 in the presence of a hold signal, it is moved downstream until it actuates the next to the last proximity switch 32''. This condition is delivered to the programmable controller 40 which immediately deenergizes solenoid 35'' to shut-off the vacuum generator 30' whereupon the second bundle is brought to a stop on table 12 immediately behind the aforesaid first bundle. See bundle B''.

This procedure repeats itself until the tabletop 12b is filled up, so long as the "hold" signal remains on.

As soon as the "hold" signal is removed, programmable controller 40 again energizes solenoid 35'. All of the vacuum generators are deenergized except for the vacuum generator at the downstream end of table 12 associated with solenoid 35' whereupon the first bundle is drawn against the upper run 16a of the moving belt and is moved off of the table 12 on to an adjacent conveyor or appropriate take-off device. The remaining bundles will index simultaneously one bundle length (i.e. the length of one vacuum chamber 24) after a slight delay from the first bundle. This is accomplished by energizing solenoid 35'' after a predetermined delay to delivery the next to the last bundle to the position previously occupied by the last bundle. Thereafter, solenoid 35''' is energized after a predetermined delay causing the bundle over vacuum chamber 24'''' to be indexed one bundle length so that it is now over vacuum chamber 24''. After another adjustable time delay, the next to the last bundle, which is now located in the position previously occupied by the last bundle, is caused to exit from the table top 12 by energization of solenoid 35' after a predetermined delay. The remaining bundles are again indexed one bundle length in the delivery direction until the desired group of bundles have been delivered to the take-off apparatus. It should be noted that only one vacuum chamber is vacuumized at any given time (to conserve energy). However, if multiple bundles are being indexed simultaneously, a corresponding number of vacuum chambers are simultaneously turned on.

Utilizing this method, the bundle rate per minute from the vacuum accumulating table can be precisely metered.

If desired, the table can be lengthened or shortened to accomodate a greater or lesser number of vacuum chambers and hence a greater or lesser number of bundles. Regardless of the number of vacuum chambers and hence bundles which can be accomodated, the system may be utilizied to deliver a group of bundles up to the maximum number of bundles capable of being accomodated by the vacuum accumulating conveyor or alternatively any number less than the maximum number. The vacuum chambers are arranged to provide on vacuum chamber per bundle length.

In the preferred embodiment, approximately 75% of the bundle rests upon the slick top surface 12b. The remaining 25% of the bundle is positioned above the upper run 16a of moving belt 16 which may either be an open-weave belt or a belt made of a solid material such as rubber or a rubber-like material and having a multiplicity of holes or perforations to allow for the passage of air therethrough. In the preferred embodiment, the top of the belt is recessed approximately 0.06 inches below the slick top surface 12b. If no vacuum is applied to a vacuum chamber, the friction between the belt and the bundle is far less than the friction between the slick top and the bundle so that the bundle will not move. By applying compressed air to the vacuum generating device 12, a vacuum condition is created in the vacuum chamber located underneath a perforated belt. This negative pressure draws the bottom of the bundle against the moving belt causing the bundle to achieve the same velocity as the moving belt. Turn-on and turn-off of the vacuum generator in a sequence in the manner described hereinabove causes the bundles to be selectively moved and halted. The pneumatic proximity sensors identify the location of the bundles and are utilized to indicate the proper sequence for turn-on of the vacuum generating devices, which are operated intermittently to thereby save air consumption. The technique described makes it possible to accumulate bundles one right behind the other. The advantage of the vacuum accumulating conveyor of the present invention is that there is practically no back pressure when accumulating bundles. The bottom sheet of a bundle is not damaged since it hardly touches the perforated belt when no vacuum is applied.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for controlling the movement of bundles, packages, and the like along a predetermined path comprising:
a conveying surface including first and second elongated members arranged in spaced, substantially parallel fashion defining an elongated gap space therebetween;
the top surfaces of said members being substantially flat and lying in a common plane;
a closed loop conveyor belt having an elongated upper run positioned within said gap, the top surface of the upper run of said belt lying a spaced distance below the top surface of both of said elongated members;
means for continuously moving the upper run of said belt along said gap;
a plurality of chambers arranged end-to-end at spaced intervals beneath said belt upper run;
means for creating a vacuum in selected ones of said chambers;
said chambers being open along their upper ends, said belt upper run moving over the open ends of said chambers;
said belt being designed to freely pass air therethrough to cause the surface of a bundle positioned over a vacuumized chamber and resting upon said low friction surfaces to be drawn against said moving belt whereby said belt moves said bundle over each vacuumized chamber and whereby the bundle is halted when the belt passes over a chamber which is not vacuumized.

2. The apparatus of claim 1 wherein the length of each chamber measured in the feed direction is equal to or less than the length of a bundle measured in the feed direction.

3. The apparatus of claim 1 wherein the width of said elongated members measured in a direction perpendicular to the feed direction and the width of said gap is selected so that at least 50% of the surface of a bundle slides upon said slick top surfaces.

4. The apparatus of claim 3 wherein between 50% and 85% of the bottom surface of a bundle slides upon said slick top surfaces.

5. The apparatus of claim 3 wherein between 65% and 85% of a bundle slides upon said slick top surfaces.

6. The apparatus of claim 1 wherein the closed loop belt is provided with holes along its entire length to permit air to be drawn through said belt by a vacuum chamber when vacuumized.

7. The apparatus of claim 1 wherein the top external surface of said belt is formed of a material which enhances the adherence of a bundle thereto.

8. The apparatus of claim 7 wherein the external surface of said belt is at least slightly adhesive.

9. The apparatus of claim 1, wherein said belt is formed of an open-weave material.

10. The apparatus of claim 1 wherein the top surface of the top run of said belt lies a predetermined distance below the slick top surfaces of said elongated members, said distance being in the range of from 0.03 to 0.09 inches.

11. The apparatus of claim 1 further comprising a plurality of proximity sensors mounted on said conveying surface and each being aligned with an associated one of said vacuum chambers for generating a sensing signal as a bundle passes over said sensor;
control means responsive to a signal from a selected one of said sensors for vacuumizing the chamber associated the said sensor generating a sensing signal for moving a bundle along the portion of said delivery path above the vacuumized vacuum chamber.

12. The apparatus of claim 11 wherein said control means further comprises means responsive to a sensing signal from the proximity sensor at the downstream end of the conveying surface for removing a vacuum condition from the associated vacuum chamber located at said downstream end to halt a bundle at said predetermined location.

13. The apparatus of claim 11, comprising means responsive to receipt of a sensing signal from the sensor next to the downstream end for removing the vacuum condition from the associated vacuum chamber to halt the next bundle adjacent to the first mentioned bundle.

14. The apparatus of claim 11 wherein said path has an input end for receiving bundles from a conveying means;
an input end proximity sensor arranged at the input end for generating a start signal responsive to a bundle moving over said input end proximity sensor;
said control means including means responsive to said start signal and to a delivery request signal for sequentially energizing each of the vacuum creating means when each proximity sensor senses the presence of a bundle.

15. The apparatus of claim 11, wherein said proximity sensor comprises a pneumatic proximity sensor.

16. The apparatus of claim 15, wherein said pneumatic proximity sensor comprises:
an inlet for receiving air under pressure;
an outlet for delivering air;
and a sensing portion for deflecting inlet air to said outlet when a body passes in close proximity to said sensing portion.

17. The apparatus of claim 16, further comprising a pneumatic-to-electrical switch, coupled to said sensor outlet, said electrical switch normally assuming a first position and being moved to a second position responsive to air delivered thereto from said sensor outlet.

18. The apparatus of claim 1 further comprising a plurality of elongated members arranged in spaced parallel fashion and extending along the length of said elongated gap, the top ends of said members slidably supporting the top run of said moving belt.

19. The apparatus of claim 1, wherein said vacuum means comprises a vacuum generator.

20. The apparatus of claim 1, wherein said vacuum means comprises an air flow amplifier.

21. The apparatus of claim 1, wherein said vacuum means comprises an air flow amplifier having an input for receiving air under pressure and for creating a vacuum in said vacuum chamber when in a first operating state and for removing the vacuum condition from said vacuum chamber when in a second operating state.

22. The apparatus of claim 21, wherein said air flow amplifier further comprises solenoid means for moving said air flow amplifier to said first state when energized and to said second state when deenergized.

* * * * *